(12) United States Patent
Noguchi

(10) Patent No.: US 9,723,187 B2
(45) Date of Patent: Aug. 1, 2017

(54) LIGHT AMOUNT ADJUSTING APPARATUS, LENS BARREL, OPTICAL APPARATUS, AND IMAGING APPARATUS

(71) Applicant: CANON KABUSHIKI KAISHA, Tokyo (JP)

(72) Inventor: Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 14/645,772

(22) Filed: Mar. 12, 2015

(65) Prior Publication Data
US 2015/0260947 A1 Sep. 17, 2015

(30) Foreign Application Priority Data
Mar. 13, 2014 (JP) .................................. 2014-049834

(51) Int. Cl.
H04N 5/238 (2006.01)
H04N 5/225 (2006.01)
G03B 9/06 (2006.01)

(52) U.S. Cl.
CPC ............. H04N 5/2254 (2013.01); G03B 9/06 (2013.01)

(58) Field of Classification Search
CPC ........ H04N 5/238; H04N 5/2353; G03B 7/00; G03B 7/003; G03B 9/10; G03B 9/12; G03B 9/14; G03B 9/16; G03B 7/10
USPC ......... 348/363, 367–368; 396/257, 259, 493, 396/497; 359/738–739
See application file for complete search history.

(56) References Cited

U.S. PATENT DOCUMENTS

| | | | | |
|---|---|---|---|---|
| 8,070,370 B2 * | 12/2011 | Kawamoto | ............. | F16H 55/18 396/505 |
| 2003/0007802 A1 * | 1/2003 | Noguchi | .................. | G03B 9/10 396/493 |
| 2004/0239797 A1 * | 12/2004 | Masuda | .................... | G03B 9/24 348/362 |
| 2005/0094291 A1 * | 5/2005 | Onishi | .................... | F21V 11/10 359/738 |
| 2007/0077061 A1 * | 4/2007 | Watanabe | ........... | H04M 1/0264 396/493 |
| 2008/0030604 A1 * | 2/2008 | Ehara | .................... | H04N 5/2254 348/296 |
| 2011/0037874 A1 * | 2/2011 | Ishimasa | .................. | G03B 9/14 348/229.1 |
| 2012/0300119 A1 * | 11/2012 | Saito | ........................ | G03B 9/06 348/362 |

FOREIGN PATENT DOCUMENTS

| | | |
|---|---|---|
| JP | 6336568 Y2 | 9/1985 |
| JP | 2003121901 A | 4/2003 |
| JP | 2009133440 A | 6/2009 |
| JP | 2010142665 A | 7/2010 |

* cited by examiner

Primary Examiner — Kelly L Jerabek
(74) Attorney, Agent, or Firm — Rossi, Kimms & McDowell LLP

(57) ABSTRACT

Provided is a light amount adjusting apparatus comprising a base that has a rotary drive unit, and a rotating unit that is arranged rotatably about a predetermined axis with respect to the base, and drives aperture blades by rotating with the rotary drive unit, wherein one of the base and the rotating unit is provided with two arc-shaped parts to be engaged around the axis, the other is provided with two engaging parts engaging with each of the arc-shaped parts to be engaged.

10 Claims, 8 Drawing Sheets

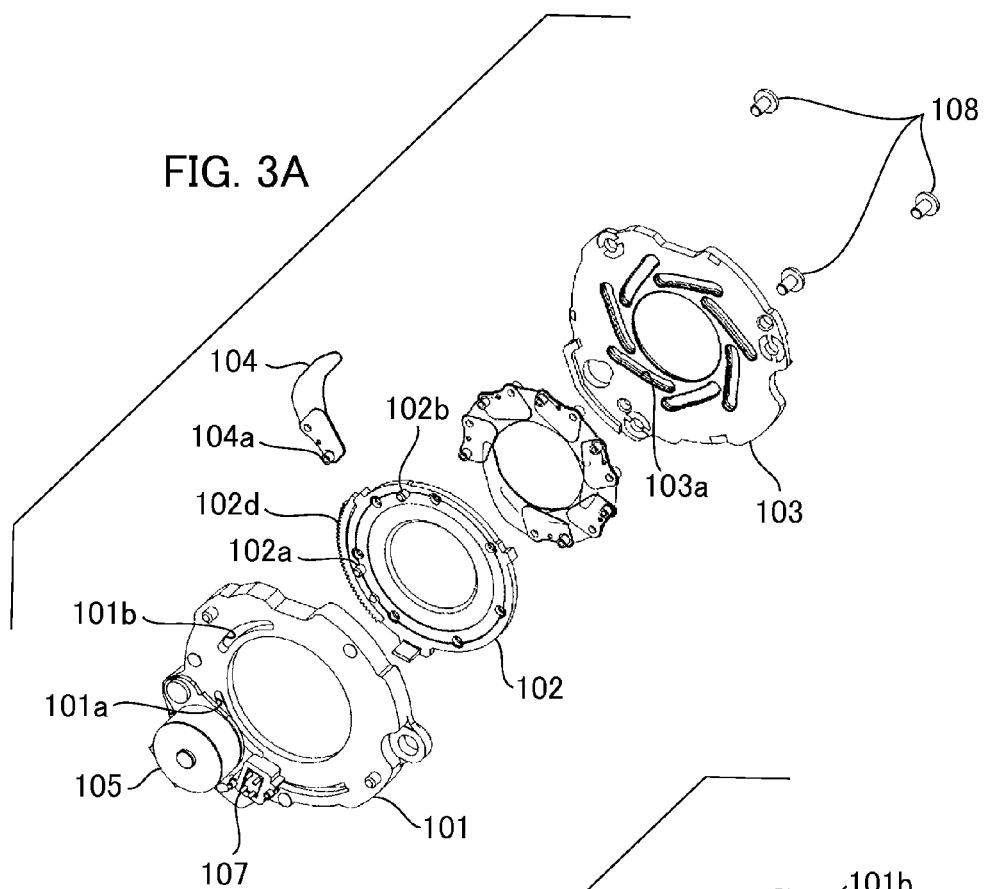
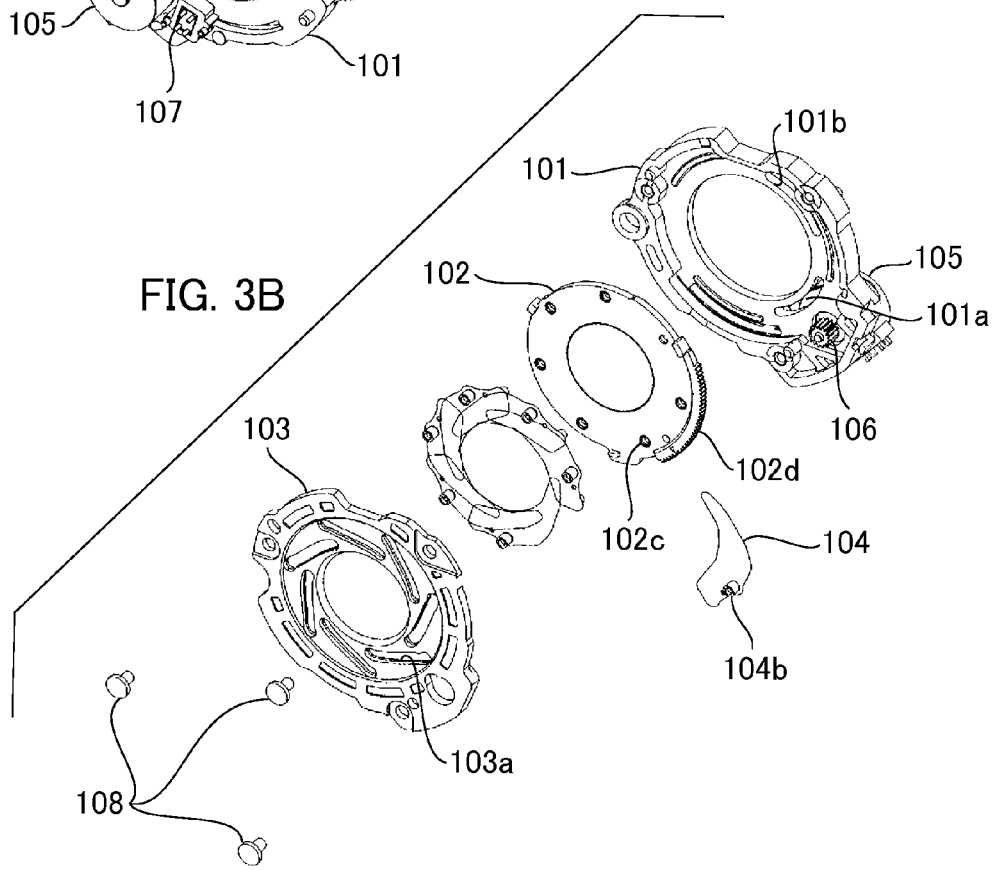

(a)

(b)

LIGHT AMOUNT ADJUSTING APPARATUS, LENS BARREL, OPTICAL APPARATUS, AND IMAGING APPARATUS

BACKGROUND OF THE INVENTION

Field of the Invention

The present invention relates to a light amount adjusting device that adjusts a light amount by changing an opening diameter of an aperture, a lens barrel mounting the same, and the like.

Description of the Related Art

Optical apparatuses such as interchangeable lenses for a camera may control an opening diameter of an the aperture using a light amount adjusting apparatus arranged in an optical system in order to make the brightness of photographed images appropriate or to vary the depth of field. For example, such a light amount adjusting apparatus may drive aperture blades to change the opening diameter of the aperture by rotating a rotary ring that is provided in the optical path and rotatable about the optical axis, thereby adjusting the light amount passing through the opening of the aperture. Rotary rings driving aperture blades in this way or the like are often rotated by transmitting the driving power of motors or the like via gears. However, the use of a gear mechanism causes backlash or operating noise of gears. Because these have an effect on the accuracy of the control of the opening of the aperture, it is preferable to reduce backlash or operating noise of gears wherever possible. In particular, when the aperture diameter is controlled in response to a variation of the brightness of an object during photographing, drives to both aperture closing direction and aperture opening direction are needed, which cause frequent inversion driving of a motor during photographing, and thereby the backlash increase and operating noise becomes louder.

Japanese Patent Laid-Open No. 2003-121901 discloses a configuration in which an intermediate gear is arranged between the output gear of a motor and a gear of a windmill to be rotated, and the intermediate gear is biased in a predefined direction to suppress the backlash or operating noise of gears. Also, Japanese Patent Laid-Open No. 2009-133440 discloses a configuration in which an elastic gear is provided so as to overlap with a drive ring to be rotated, and the operating noise caused by backlash is reduced by the elastic deformation of the elastic gear.

In the above-mentioned conventional art, as disclosed in Japanese Patent Laid-Open No. 2003-121901 and No. 2009-133440, the rotary ring driving aperture blades is not supported in the center thereof but is engaged with and supported by a plurality of protrusions arranged in its circumference to guide the rotation for the purpose of ease of rotation of the rotary ring. In particular, such a rotary ring is provided with a clearance between the rotary ring and a plurality of protrusions supporting the rotary ring for the purpose of ensuring a certain amount of dimensional tolerance to guarantee that the rotary ring is able to rotate even if a change in dimension due to temperature or humidity, a deformation in setting up or the like may occur. Due to such clearance of the engagement, the center of the rotary ring is more likely to cause eccentric. In addition, the gear mechanism provided for such a rotary ring is configured by engaging a driven gear arranged in the circumference of the rotary ring with a driving gear. Because of this, when the rotary ring is eccentric in the direction in which the driving gear separates from the driven gear on the circumference of the rotary ring, the backlash in engagement become larger. Therefore, the engagement of gears is delayed by that amount, resulting in the occurrence of a delay in change of the opening diameter of the aperture, and thus, the accuracy of the control of the opening diameter of the aperture will be degraded.

However, in Japanese Patent Laid-Open No. 2003-121901 and No. 2009-133440, such delay in the change of the opening diameter of the aperture due to the clearance of the engagement in rotatable support of the rotary ring has not been taken into account. Also, the addition of a configuration to decrease the backlash of gears used in the above-mentioned conventional art may increase drive load and also lead to an increase in the size of the apparatus or an increase in power consumption.

SUMMARY OF THE INVENTION

The present invention provides, for example, a light amount adjusting apparatus which enables high-accuracy control of an opening diameter of aperture and to decrease drive noise with a simple configuration without increasing unnecessary drive load.

According to the present invention, a light amount adjusting apparatus, which is located in an optical path, for driving aperture blades changing an opening diameter to adjust a light amount is provided, that comprises a base that has a rotary drive unit, and a rotating unit that is arranged rotatably about a predetermined axis with respect to the base, and drives the aperture blades by rotating with the rotary drive unit, wherein one of the base and the rotating unit is provided with two arc-shaped parts to be engaged around the axis, the other is provided with two engaging parts engaging with each of the arc-shaped parts to be engaged.

Further features of the present invention will become apparent from the following description of exemplary embodiments (with reference to the attached drawings).

BRIEF DESCRIPTION OF THE DRAWINGS

FIG. 3A is an exploded perspective view of the aperture unit viewed from the same direction as shown in FIG. 2A.

FIG. 3B is an exploded perspective view of the aperture unit viewed from the same direction as shown in FIG. 2B.

DESCRIPTION OF THE EMBODIMENTS

Hereinafter, preferred embodiments of the present invention will now be described with reference to the accompanying drawings.

First Embodiment

Figure 1:
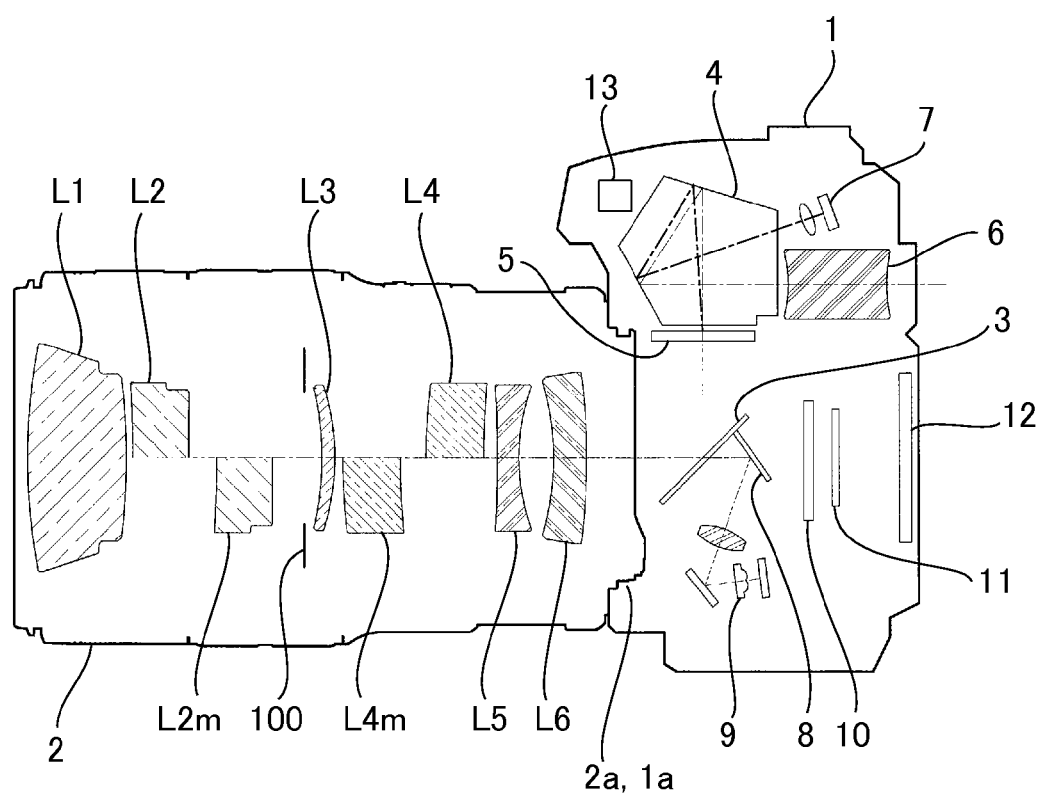
FIG. 1 is a cross-sectional view of a main part of a single-lens reflex camera and an interchangeable lens in which a light amount adjusting apparatus according to a first embodiment of the present invention can be mounted.

Firstly, a description will be given of a specific example of an imaging apparatus (optical apparatus) in which a light amount adjusting apparatus according to a first embodiment of the present invention can be mounted. Here, in the following description, interchangeable lens type single lens reflex digital cameras will be used as such an imaging apparatus (optical apparatus). FIG. 1 is a cross-sectional view of a main part of an interchangeable lens type single lens reflex digital camera and an interchangeable lens in which the light amount adjusting apparatus according to the present embodiment is mounted. The single lens reflex digital camera shown in FIG. 1 comprises a camera 1 and an interchangeable lens (lens barrel) 2. A camera mount 1a provided in the camera 1 and a lens mount 2a provided in the interchangeable lens 2 are mechanically demountable by means of so-called bayonet connection. The camera 1 and the interchangeable lens 2 perform electrical communication through the mounts. The camera 1 comprises a main mirror 3, a pentaprism 4, a focusing plate 5, a viewfinder lens 6, a photometry unit 7, a sub mirror 8, a focus detection unit 9, a focal plane shutter unit 10, an imaging element 11, a display panel 12, and a microphone unit 13. According to such a single lens reflex digital camera, a subject image formed by the interchangeable lens 2 is reflected by the main mirror 3, formed on the focusing plate 5, converted into an erected image by the pentaprism 4, and then can be observed by the viewfinder lens 6. The photometry unit 7 comprises a photometry sensor comprised of a plurality of light receiving parts and a photometric lens to re-form the subject image formed on the focusing plate 5 on the photometry sensor, detecting the luminance of the subject image. Regarding the subject image formed by the interchangeable lens 2, a part of luminous flux passing through the main mirror 3 is reflected by the sub mirror 8, and led to the focus detection unit 9. The focus detection unit 9 comprises a field lens, a secondary image forming lens, and a pair of AF sensors, performing focus detection by means of called phase difference method. The imaging device 11 is a photoelectric conversion element such as a CCD or a CMOS that can extract the amount of light as electric signals. A sensor surface of the imaging element 11 and a sensor surface of the AF sensor of the focus detection unit 9 are in a conjugated position, and thus, a focusing state in the imaging element 11 can be detected preliminarily by the focus detection unit 9. The display panel 12 is capable of confirming a subject image obtained from the imaging element 11, and other confirmation of various kinds of photographic information or mode setting of the camera are performed using an operation means (not illustrated). The microphone unit 13 acquires the sound of a subject.

Here, the interchangeable lens 2 described above is one that is demountable with respect not only to cameras as shown in FIG. 1, but also to an imaging apparatus (optical apparatus) such as a digital still camera and a video camera comprising an imaging element, or a still camera using silver salt film. In this regard, the interchangeable lens 2 may be built in an imaging apparatus, and also, for example, may be an interchangeable lens mounting to or demounting from a projection apparatus such as a projector and the like, or may be built in a projection apparatus. The interchangeable lens 2 includes an optical system consisting of six lens groups, which are a first lens group L1, a second lens group L2, a third lens group L3, a fourth lens group L4, a fifth lens group L5, and a sixth lens group L6. The first lens group L1, the third lens group L3, the fifth lens group L5, and the sixth lens group L6 are fixed with respect to the optical axis direction. The second lens group L2 and the fourth lens group L4 perform focusing operations and move with respect to the optical axis direction. In FIG. 1, different operation states are shown in an upper and a lower side of the optical axis (shown by a chain line in FIG. 1) to facilitate understanding the explanations of movements. Specifically, the second lens group L2 and the fourth lens group L4 in an infinity focusing state are shown in the upper side of the optical axis (shown by a chain line in FIG. 1), and the second lens group L2$m$ and the fourth lens group L4$m$ in a nearest focusing state are shown in the lower side of the optical axis.

The interchangeable lens (lens barrel) 2 of the camera 1 is provided with the light amount adjusting apparatus according to the present embodiment as a aperture unit 100. The aperture unit 100 is located in an optical path of the interchangeable lens, driving aperture blades to change an opening diameter of an aperture, thereby adjust a light amount passing through the opening of the aperture. That is, the opening diameter of the aperture unit 100 is controlled for the purpose of appropriately adjusting the brightness of a photographic image, or changing a range substantially focusing on a subject (depth of field). Adjustments of the opening diameter of the aperture can be performed by a photographer's manual operation, or can be performed by an automatic operation based on an operation command from an imaging apparatus.

Figure 2A:
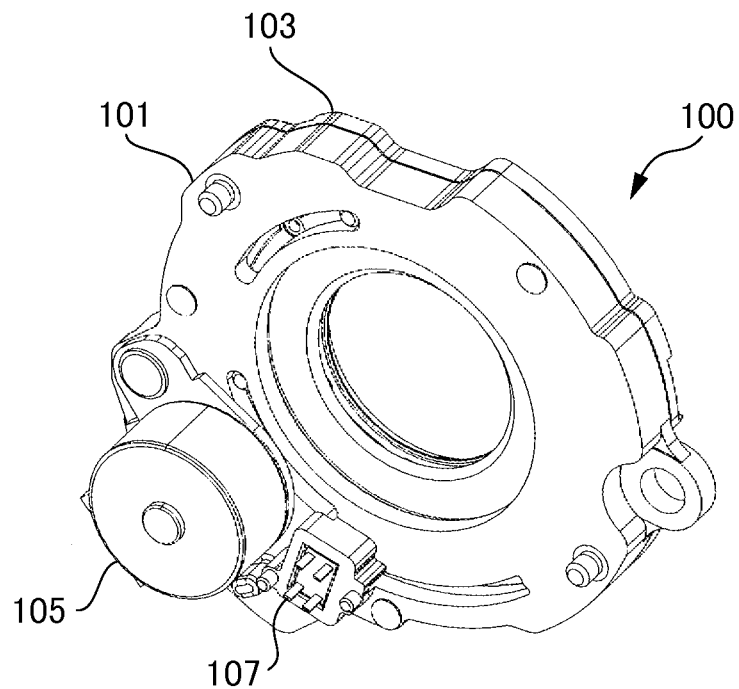
FIG. 2A is a perspective view of the aperture unit as shown in FIG. 1 viewed from the side of an aperture base plate.
Figure 2B:
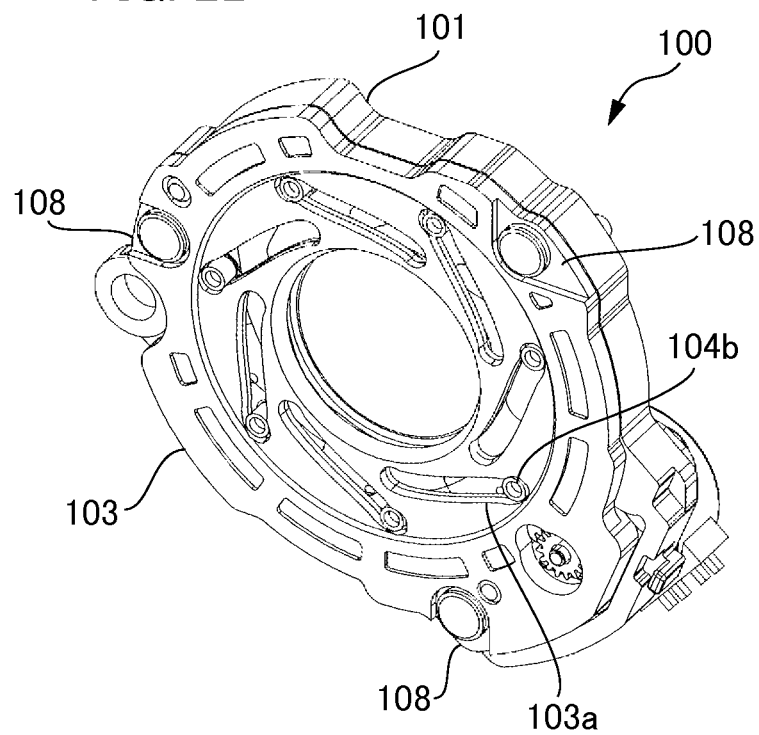
FIG. 2B is a perspective view of the aperture unit as shown in FIG. 1 viewed from the side of a cam plate.

Next, a description will be given of a specific configuration of the aperture unit 100. FIG. 2A and FIG. 2B show perspective views of the aperture unit 100 from one side and the opposite side respectively. FIG. 3A and FIG. 3B are exploded perspective views of the aperture unit 100 from the same sides as FIG. 2A and FIG. 2B respectively. The aperture unit 100 includes an aperture base plate (base) 101, an aperture driving ring (rotating unit) 102, a cam plate 103, aperture blades 104, and a stepping motor (rotary drive unit) 105. The stepping motor 105 is positioned and fixed by a screw onto the aperture base plate 101. The aperture unit 100 further includes a pinion gear (driving gear) 106 and an open switch 107 that detects an open state of the aperture. The aperture driving ring 102 arranged rotatably about a predetermined axis with respect to the aperture base plate 101, and seven aperture blades 104 are housed between the aperture base plate 101 and the cam plate 103. Further, the aperture base plate 101 and the cam plate 103 are positioned and fastened by three fixing screws 108, and thereby the aperture unit is formed into a unit. The aperture unit 100 is located in the optical path of the interchangeable lens so that the predetermined axis corresponds to an optical axis of an optical system included in the interchangeable lens. Each of the aperture blades 104 is provided with a rotation pin 104a and a cam pin 104b. The aperture driving ring 102 is provided with seven rotation holes 102c engaging with rotation pins 104a that are disposed uniformly in a circumferential direction, and seven aperture blades 104 are rotatably supported with respect to the rotation pins 104a. The cam plate 103 is provided with seven cam grooves 103a engaging with the cam pins 104b that are disposed uniformly in a circumferential direction. When the aperture driving ring 102 is rotated, the cam pins 104b engaging with the cam grooves 103a rotate the aperture blades 104 along with the cam grooves 103a centering on the rotation pins 104a. The seven aperture blades 104 are disposed uniformly in the circumferential direction in the same supporting structure, thus the opening diameter of the aperture can be set as desired with the rotation of the aperture driving ring 102. The aperture base plate 101 is provided with two rotation guide grooves (arc-shaped grooves, arc-shaped parts to be engaged) 101a and 101b formed with circular arc shapes centered on the optical axis. The aperture driving ring 102 is provided with two rotation guide pins (pins, engaging parts) 102a and 102b formed on the circumference of the same radius centered on the optical axis. The rotation guide pins 102a and 102b engage with the rotation guide grooves 101a and 101b respectively with a fit tolerance having an appropriate clearance, to guide the rotation of the aperture driving ring 102 centering on the optical axis. A ring gear (driven gear) 102d meshing with the pinion gear 106 is provided in a peripheral part of the aperture driving ring 102, transmitting the rotation of the stepping motor 105 to the aperture driving ring 102. Each of the rotation guide pins 102a and 102b is located in a position closer to the optical axis than the ring gear 102d in the aperture driving ring 102. In the present embodiment, the rotation guide grooves (arc-shaped grooves, arc-shaped parts to be engaged) 101a and 101b may be penetrated or may not be penetrated.

Figure 4A:
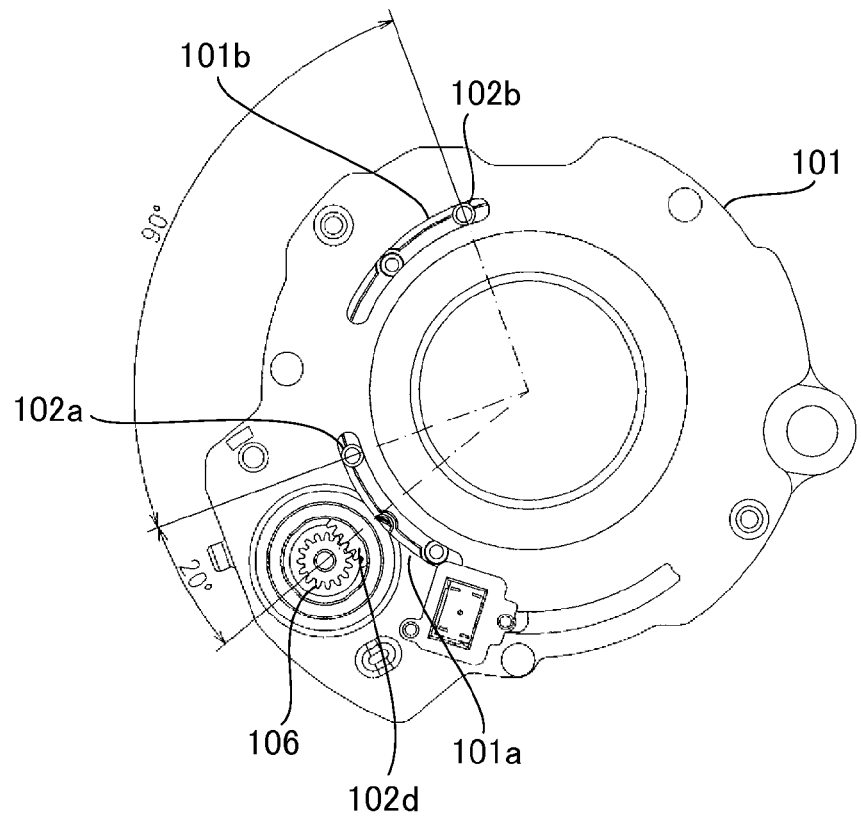
FIG. 4A illustrates a configuration of the aperture unit in a state of an open aperture according to the first embodiment.
Figure 4B:
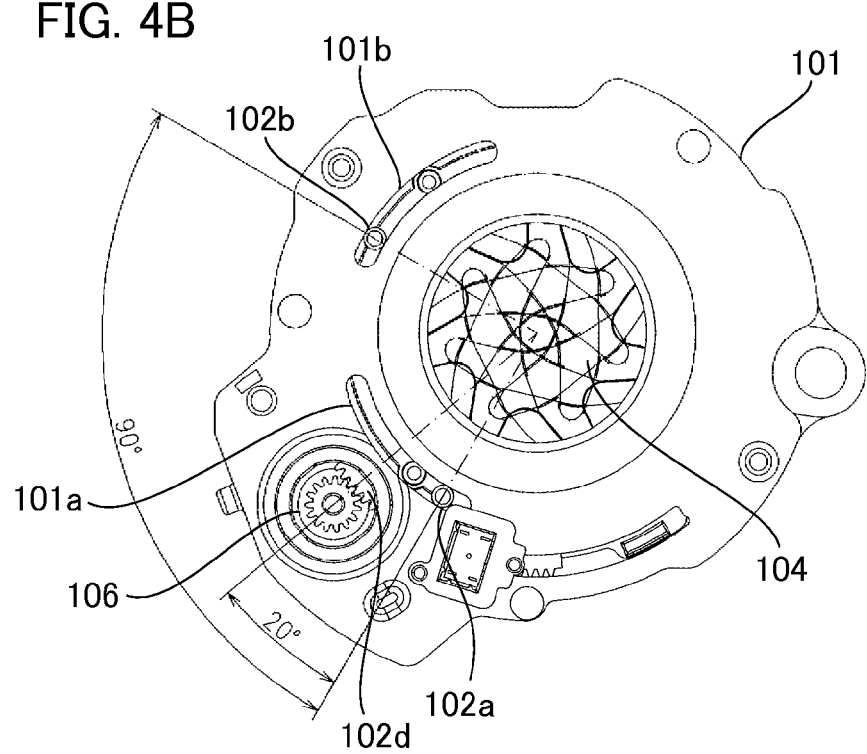
FIG. 4B illustrates a configuration of the aperture unit in a state of a minimum aperture according to the first embodiment.

Further, a description will be given of an arrangement of the rotation guide pins 102a and 102b, and the pinion gear 106 of the above mentioned aperture unit. FIG. 4A shows the aperture unit 100 in the state of the open aperture, and FIG. 4B shows the aperture unit 100 in the state of the minimum aperture. FIG. 4A and FIG. 4B are views from the aperture base plate 101 side, and the stepping motor 105 is omitted to facilitate understanding the explanation. The rotation guide pins 102a and 102b are located on the aperture driving ring 102 at an angle of 90 degrees about the optical axis. In the state of the open aperture shown in FIG. 4A, the guide pin 102a is arranged at a position rotated 20 degrees clockwise from the pinion gear 106, and in the state of the minimum aperture shown in FIG. 4B, it is arranged at a position rotated 20 degrees counterclockwise from the pinion gear 106. That is, the rotation angle of the aperture driving ring 102 from the open aperture to the minimum aperture is 40 degrees, and for example, the angle of the rotation guide pin 102a and the pinion gear 106 about the optical axis become the same at the middle of the rotation angle range. In this way, it is preferred that one of the rotation guide pins (pins, engaging parts) is arranged at an angle that is matched with the angle that the driving gear is arranged about the optical axis. Accordingly, the eccentricity of the center of the aperture driving ring (rotating unit) 102 in the direction connecting the center of the pinion gear (driving gear) 106 and the center of the ring gear (driven gear) 102d of the aperture driving ring 102 can be minimized. The effect of suppressing the eccentricity in that direction can be enhanced, and thereby, the generation of backlash and operating noise can be suppressed properly.

Thus, in the aperture driving ring 102 according to the present embodiment, the rotation guide pins 102a and 102b are engaged with the rotation guide grooves 101a and 101b respectively, and thereby, the rotation of the aperture driving ring 102 can be guided. Accordingly, the eccentricity of the center of the aperture driving ring 102 can be substantially suppressed compared to conventional configurations in which only a circumference of a ring is engaged with a plurality of protrusions to guide the rotation of the ring. Therefore, separation of the ring gear 102d located on the periphery of the aperture driving ring 102 and the pinion gear 106 driving it can be suppressed, and generation of backlash and operating noise resulting from their mesh can be substantially suppressed. This will enable suppressing a delay in the change of the opening diameter of the aperture or the like due to a delay in mesh of gears, and thus, substantially improve accuracy of the control of the opening diameter of the aperture. In particular, in conventional configurations in which only a circumference of a ring driving aperture blades is engaged with a plurality of protrusions to thereby guide the rotation of the ring, the diameter of the periphery of the ring is very large, and thus, a tolerance setting (setting of clearance) of engaging parts between the periphery of the ring and the protrusions must be large. Therefore, the amount of the eccentricity of the center of the ring driving the aperture may also become large. In contrast, the amount of the eccentricity of the center of the aperture driving ring 102 in the present embodiment corresponds to a tolerance setting (setting of clearance) of the engagement between the rotation guide pins 102a and 102b and the rotation guide grooves 101a and 101b. Therefore, because the diameter of the rotation guide pins 102a and 102b is much smaller than the diameter of periphery of the aperture driving ring 102, the tolerance of the engagement thereof can be set substantially small. This means that, as mentioned above, the eccentricity of the center of the aperture driving ring 102 can be substantially suppressed in the present embodiment compared to conventional configurations in which only a circumference of a ring is engaged with a plurality of protrusions to thereby guide the rotation of the ring. As a result, the accuracy of the control of the opening diameter of the aperture can be substantially improved more than the prior art. Details of a relationship between the amount of the eccentricity of the aperture driving ring 102 and the tolerance setting (setting of clearance) of the engaging part guiding the rotation thereof will be described below.

Here, a relationship between the amount of the eccentricity of the aperture driving ring 102 and a tolerance setting (setting of clearance) of the engaging part guiding the rotation thereof will be described in detail with reference to the accompanying drawings. Firstly, prior to a specific description in the present embodiment, a description will be given of a setting of the clearance in the case of guiding the movement of movable members by means of the engagement described above. Generally, industrial products are made to accomplish a desired function by means of assembling a plurality of parts, and thus, an allowance range referred to as a "tolerance" is set for the finished dimension of each portion of the respective parts. It is necessary to set an appropriate tolerance for a shape dimension according to a machining method for the parts, otherwise manufacturing will be difficult in relation to a machining time and cost. Also, due consideration should be given to the fact that generally the bigger a shape dimension becomes, the larger the range of realizable finished dimension is. For example, to engage two parts to each other and smoothly guide relative movements between them, a tolerance setting of portions as clearance will be important. When parts are made such that the dimensions of engaging parts overlap, it is impossible to fit them together. Also, even if parts are barely fitted with no clearance, there is the possibilities that the parts will become stuck when a change in dimension occurs because of temperature or humidity, a deformation due to assembling or the like occur thereby a clearance is blocked. Therefore, when setting dimensional tolerance in engaging parts, a minimum clearance needed is secured and a tolerance range is defined in the direction in which a clearance increases. Regarding the minimum clearance needed, a change in dimension due to temperature or humidity or a deformation due to assembly or the like become large when the shape dimension is relatively big, and thus, it is necessary to set the minimum clearance relatively large.

Due to such a setting of the clearance (tolerance setting), the amount of the eccentricity of the center of a ring becomes larger like a conventional one, according to a configuration guiding the rotation of the ring driving aperture blades. Therefore, a gear of a gear mechanism rotationally driving the ring can be separate easily, and backlash become large and operating noise becomes louder. In the present embodiment, a setting of the clearance (tolerance setting) can be set smaller by devising a configuration that guides the rotation of a ring driving the aperture blades. As a result, the amount of the eccentricity of the center of the ring can be suppressed. For example, in the above mentioned conventional arts, a circumference of a ring that drives the aperture blades is engaged with a plurality of protrusions, thereby guiding the rotation of the ring. In such configurations, in cases where a ring has about 15 mm diameter $\phi$, for example, it is necessary to set a large tolerance setting (setting of clearance) such as 20 μm at a minimum to 80 μm at a maximum in relation to the clearance between the circumference of the ring and a side surface of the protrusions guiding the rotation thereof. In contrast, the present embodiment has a configuration in which the rotation guide pins 102a and 102b are engaged with the rotation guide grooves 101a and 101b, thereby guiding the rotation of the aperture driving ring 102. In this configuration, in cases where the pins have 1.0 mm diameter $\phi$, for example, the tolerance can be set very small such as 6 μm at a minimum to 26 μm at a maximum, which is about one third or less than the conventional one. As a result, the amount of the eccentricity of the center of the ring driving aperture blades can be more substantially reduced than the prior art.

Figure 5A:
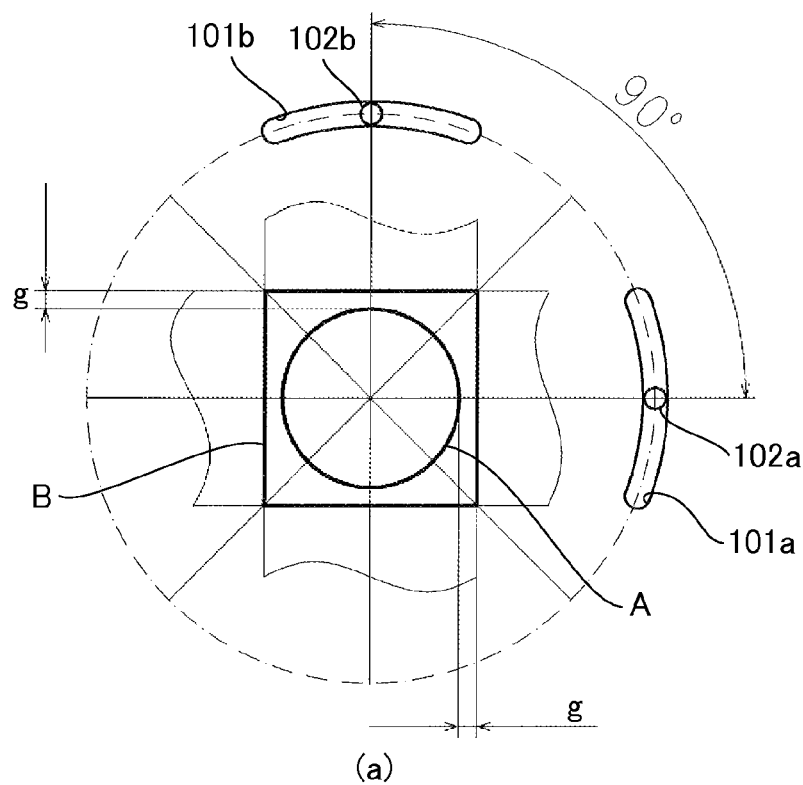
FIG. 5A illustrates the eccentricity caused by a clearance of an engagement between rotation guide pins and rotation guide grooves when the rotation guide pins are located at an angle of 90 degrees.
Figure 5B:
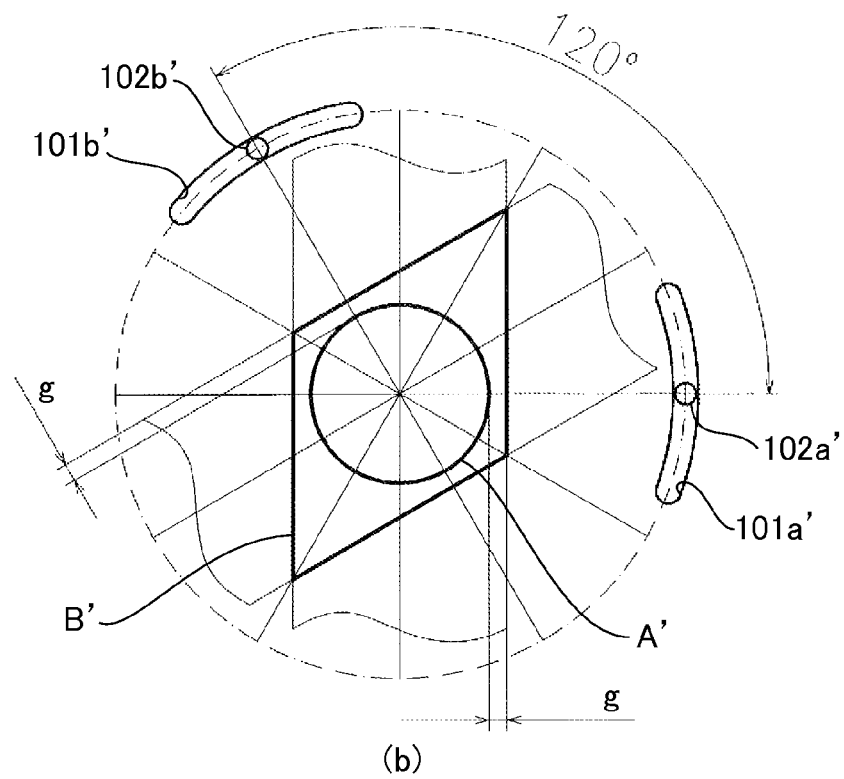
FIG. 5B illustrates the eccentricity caused by a clearance of an engagement between rotation guide pins and rotation guide grooves when the rotation guide pins are located at an angle of 120 degrees.
Figure 6A:
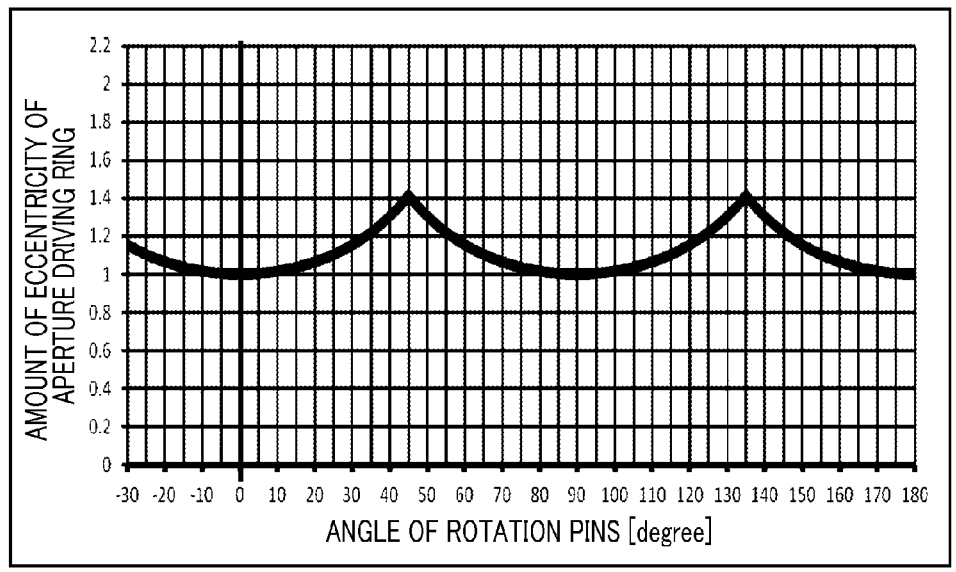
FIG. 6A is a graph illustrating the amount of the eccentricity caused by the clearance of the engagement between the rotation guide pins and the rotation guide grooves as shown in FIG. 5A.
Figure 6B:
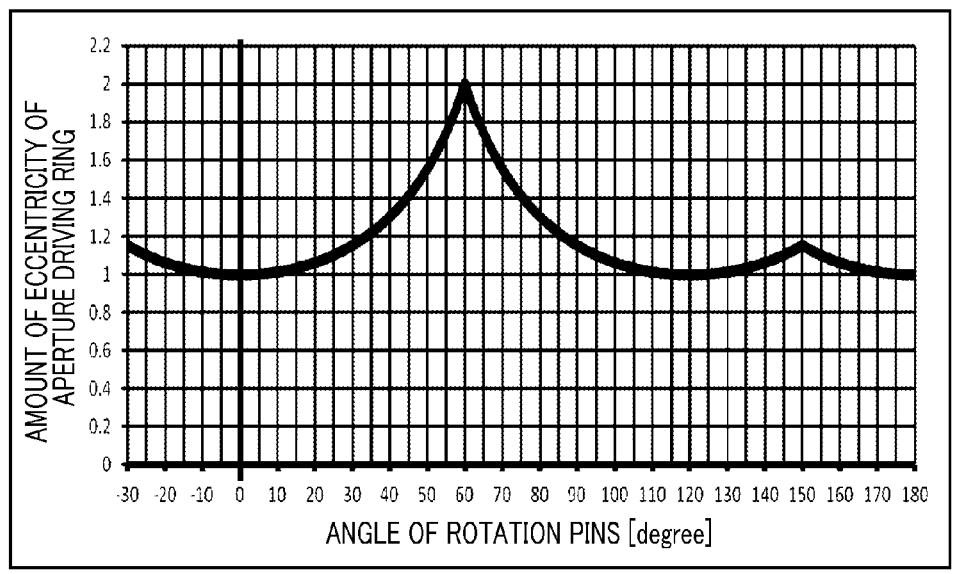
FIG. 6B is a graph illustrating the amount of the eccentricity caused by the clearance of the engagement between the rotation guide pins and the rotation guide grooves as shown in FIG. 5B.

Here, the effect of the clearance between the rotation guide pins 102a and 102b and the rotation guide groove 101a and 101b engaging with the pins respectively on the amount of the eccentricity of the aperture driving ring 102 according to the present embodiment will be described in detail. FIG. 5A is a schematic diagram illustrating a state in which the rotation guide pins 102a and 102b in the present embodiment are located at an angle of 90 degrees about the optical axis as shown in FIG. 4A and FIG. 4B, and each of the pins engaging with the rotation guide grooves 101a and 101b with a fit tolerance having a predetermined clearance. A circle "A" shown by a thick line at the center of the drawing represents the rotation guide pins 102a and 102b so as to be overlapped, and a surrounding square "B" shown by a thick line represents the rotation guide grooves 101a and 101b. Although the square "B" should be depicted by a combination of arcs to exactly represent the shape of the grooves, it will be evaluated as a square because an arc comes to close to a straight line as the radius of the arc increases, and a large error does not occur when dealing with a straight line in cases where a clearance is small. A clearance "g" between the circle "A" and the square "B" has 13 μm as the maximum value (one side of the maximum clearance 26 μm) in the above mentioned setting of the clearance for 1.0 mm diameter $\phi$ of the pins. A movable space for the circle "A" within the clearance in the square B corresponds to the amount of the eccentricity in each direction when only the eccentricity within the clearance without rotation of the aperture driving ring 102 is evaluated. Lines in the radial direction from the center are depicted evenly at an angle of 45 degrees. FIG. 5B is a schematic diagram like FIG. 5A, in which the two rotation guide pins are located at an angle of 120 degrees. Equivalent components are denoted by adding a prime symbol (') to reference characters. A circle "A'" shown by thick lines is able to move eccentrically within a rhombus "B'" shown by a thick line. Lines in the radial direction from the center are depicted evenly at an angle of 30 degrees. A setting of clearance "g" is the same as that of FIG. 5A. FIG. 6A and FIG. 6B are graphs illustrating the amount of the eccentricity caused by the clearance of the engagement. FIG. 6A and FIG. 6B correspond to FIG. 5A and FIG. 5B respectively. The horizontal axis shows an angle of the rotation pins, specifically an angle in a counterclockwise direction when the angle of the rotation pins 102a and 102a' are set to 0. The vertical axis shows the amount of the eccentricity of the aperture driving ring, specifically the amount of the eccentricity in the direction of each angle when the clearance "g" is set to 1.

Looking at FIG. 5A and FIG. 6A so as to relate them to each another, the amount of the eccentricity is 1 at 0, 90, 180 and 270 degrees, at which the pin and the groove are abutting each other orthogonally, and the maximum amount of the eccentricity is 1.4142, which is the square root of 2, at an angle shifted by 45 degrees from the above angles, specifically at an angle in the diagonal direction of the square "B". With reference to FIG. 4A and FIG. 4B, a description will be given of an alignment of the rotation guide pins 102a and 102b and the pinion gear 106 according to the present embodiment. In cases where the aperture driving ring 102 is driven by the pinion gear 106, a collision noise of teeth becomes louder as the backlash determined by the clearance between the pinion gear 106 and the ring gear 102d increases. Also, a change of the opening diameter of the aperture delays in response to a size of a clearance in the direction of 90 degrees from an engaging part of the gears. Specifically, the amount of the eccentricity at an angle at which the pinion gear 106 is located with respect to the rotation pin 102a and the amount of the eccentricity in the direction of an angle of 90 degrees therefrom have a great effect on the generation of the collision noise during an inversion driving and the delay in the change of the opening diameter of the aperture. In FIG. 4A, the pinion gear 106 meshes with the ring gear 102d of the aperture driving ring 102 at an angle of −20 degrees in the graph of FIG. 6A. In FIG. 4B, the pinion gear 106 meshes with the ring gear 102d of the aperture driving ring 102 at an angle of +20 degrees in the graph of FIG. 6A. The maximum amount of the eccentricity in both positions is 27.7 μm, which is 1.064 times of the maximum amount 26 μm in the above mentioned setting of the clearance in cases where the diameter φ of the pin is set to 1.0 mm. At respective angles, an angle of 90 degrees corresponds to an angle of 70 degrees and an angle of 110 degrees, and the amount of the eccentricity will be the same. Therefore, in the above mentioned configuration in which the circumference of the ring driving aperture blades is engaged with the plurality of protrusions to thereby guide the rotation of the ring, the amount of the eccentricity in the engagement with around 15 mm diameter φ will be 80 μm at a maximum in every direction. In contrast, the amount of the eccentricity of the aperture driving ring 102 according to the present embodiment can be reduced to about one third or less compared to the above mentioned conventional art. Furthermore, it should be apparent from the graph of FIG. 6A that the amount of the eccentricity increases rapidly as the angle approaches to 45 degrees. Therefore, as shown in FIG. 4A and FIG. 4B, it is possible to reduce effectively the amount of the eccentricity in a direction that has an effect on the performance by equalizing an angle formed by the rotation guide pin 102a and the pinion gear 106 within an angular range (for example, within an usable range of the opening diameter of the aperture) which allows rotation of the aperture driving ring 102 relative to the aperture base plate 101.

Next, looking at FIG. 5B and FIG. 6B so as to relate them to each another, the amount of the eccentricity is 1 at 0, 120, 180, and 300 degrees, at which the pin and the groove are abutting each other orthogonally, and the amount of the eccentricity is 2 at 60 and 240 degrees, which correspond to a direction of a long axis of the rhombus "B". Furthermore, at 150 and 330 degrees, which correspond to a direction of a short axis, the amount of the eccentricity is 1.1547, which is calculated by dividing 2 by root 3. Although FIG. 5B shows an example where the two rotation guide pins are located at an angle of 120 degrees, it should be understood that the relation of the clearance between the pins and the grooves remains unchanged if the angle of the rotation guide pin 102a' is changed to 180 degrees, and thereby the angle formed by the two rotation guide pins is changed to 60 degrees. In addition, in FIG. 5B, the addition of one more pair of a rotation guide pin and a rotation guide groove at a position of 240 degrees appears to be a more optimal alignment for the reason that the maximum amount of the eccentricity at every 60 degrees will be 1.1547, which is calculated by dividing 2 by root 3. However, in this case it is impossible to suppress the amount of the eccentricity so as to be small because the diameter of the circle formed by the three rotation guide pins corresponds to the shape dimension for guiding the rotation, and a tolerance setting similar to the above mentioned cases where an engagement in large diameter is used will be required. Based on the above, it is understood that 90 degrees is optimal as the angle in which the two rotation guide pins are located to suppress the amount of the eccentricity of the aperture driving ring so as to be small.

Thus, in the aperture driving ring 102 according to the present embodiment, the rotation guide pins 102a and 102b are engaged with the rotation guide grooves 101a and 101b respectively, and thereby the rotation of the aperture driving ring 102 can be guided. Accordingly, the eccentricity of the center of the aperture driving ring 102 can be substantially suppressed with a simple configuration that has small drive load. Therefore, it is possible to control the opening diameter of the aperture with a high accuracy using a simple configuration without an increase of an unnecessary drive load, and to decrease the drive noise.

Although an example in which the rotation guide grooves and the rotation guide pins are located on the base (aperture base plate) and the rotating unit (aperture driving ring) respectively is described in the first embodiment described above, the present invention is not limited to such a configuration and allows the grooves and the pins to be interchanged. That is, it is sufficient to provide the rotation guide grooves on either one of the base and the rotating unit, and to provide engaging parts engaged with each of the rotation guide grooves and guided along with the grooves on the other. A specific description will be given in the following as a second embodiment.

Second Embodiment

Next, a description will be given of a light amount adjusting apparatus according to the second embodiment of the present invention. In the first embodiment, the rotation guide grooves 101a and 101b are located on the aperture base plate 101, and the rotation guide pins 102a and 102b are located on the aperture driving ring 102. In contrast, in the present embodiment, rotation guide grooves 202a and 202b are located on an aperture driving ring 202, and rotation guide pins 201a and 201b are located on an aperture base plate 201.

Figure 7A:
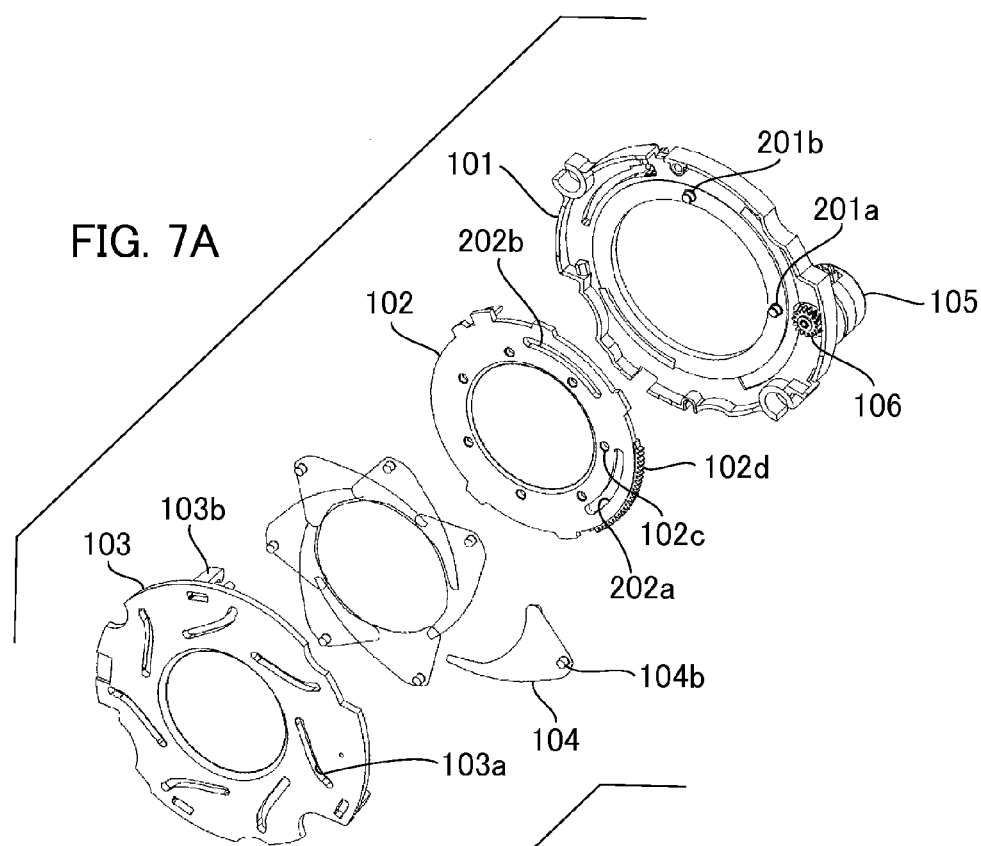
FIG. 7A is an exploded perspective view of an aperture unit according to a second embodiment of the present invention viewed from of the side of a cam plate.
Figure 7B:
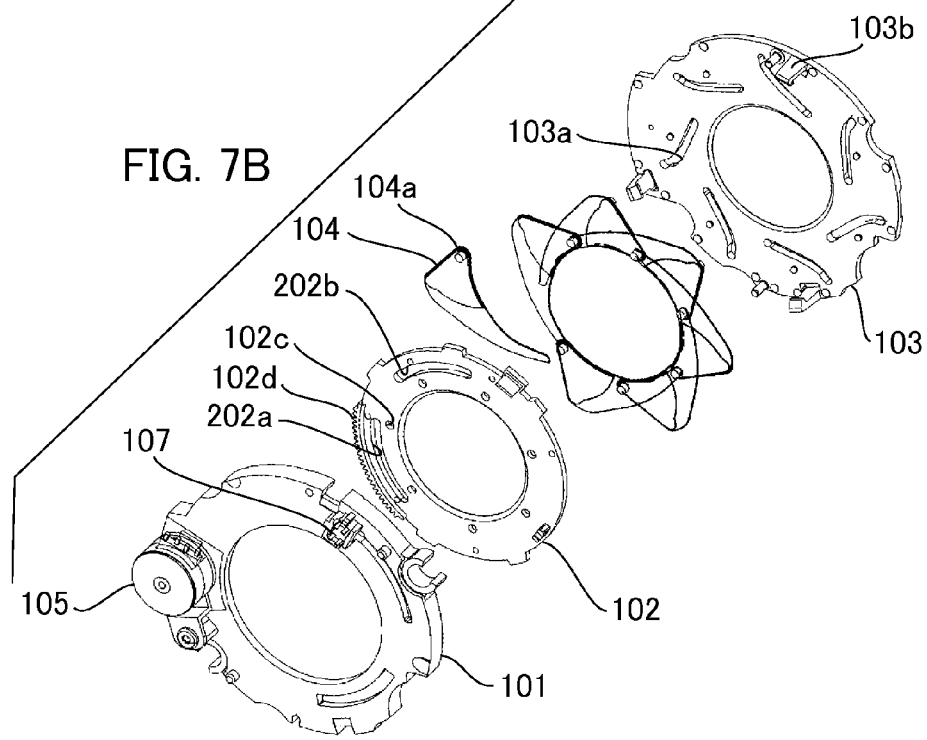
FIG. 7B is an exploded perspective view of the aperture unit according to the second embodiment of the present invention viewed from the side of an aperture base plate.

FIG. 7A and FIG. 7B, corresponding to FIG. 3A and FIG. 3B in the first embodiment, are exploded perspective views of an aperture unit of another embodiment applying the present invention. FIG. 7A and FIG. 7B represent exploded perspective views from one direction and the opposite direction respectively. In the second embodiment, the same components as the first embodiment are denoted nby the same reference character, and explanations thereof will be omitted. The aperture base plate 101 of the second embodiment is provided with the two rotation guide pins (pins, engaging parts) 201a and 201b formed on the circumference of the same radius centered on the optical axis. The aperture driving ring 102 is provided with the rotation guide grooves 202a and 202b in the form of circular arc centering on the optical axis as two arc-shaped parts to be engaged. The rotation guide pins 201a and 201b engage with the rotation guide grooves 202a and 202b respectively with a fit tolerance setting having appropriate clearance, guiding the rotation of the aperture driving ring 102 about the optical axis. Each of the rotation guide grooves 202a and 202b is located in a position closer to the optical axis than the ring gear 102d in the aperture driving ring 102.

Figure 8A:
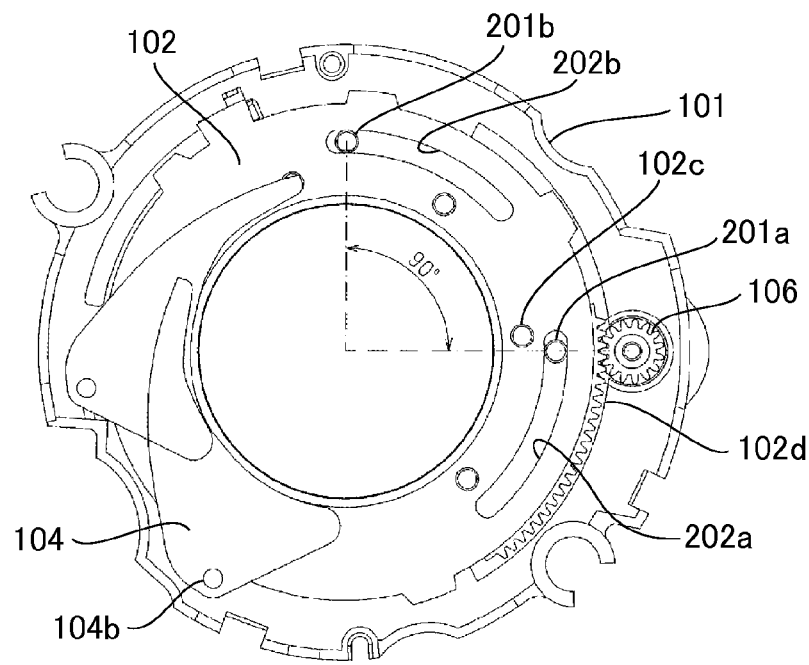
FIG. 8A is a diagram illustrating a configuration of the aperture unit in a state of an open aperture according to the second embodiment.
Figure 8B:
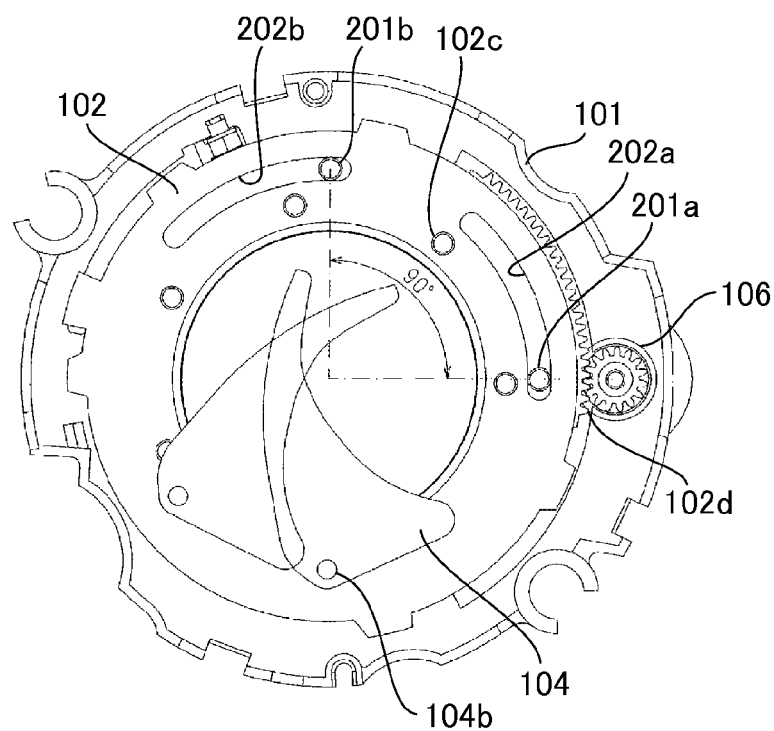
FIG. 8B is a diagram illustrating a configuration of the aperture unit in a state of a minimum aperture according to the second embodiment.

FIG. 8A and FIG. 8B, corresponding to FIG. 4A and FIG. 4B in the first embodiment, are diagrams illustrating an alignment of the rotation guide pins 201a and 201b and the pinion gear 106. FIG. 8A represents the aperture unit in a state of an open aperture, and FIG. 8B represents the aperture unit in a state of a minimum aperture. FIG. 8A and FIG. 8B are views from a side of the cam plate 103, and the cam plate 103 and a part of the aperture blades 104 are omitted to to facilitate understanding of the explanation. The rotation guide pins 201a and 201b are located on the aperture base plate 201 at an angle of 90 degrees centering on the optical axis, and the rotation guide pin 201a is arranged at the same angle as the pinion gear 106.

The present embodiment, like the first embodiment, can also substantially suppress the eccentricity of the center of the aperture driving ring 102. As a result, a delay in the change of the opening diameter of the aperture and the like caused by a delay in the mesh of gears can be suppressed, and thus, the accuracy of the control of the opening diameter of the aperture can be substantially improved. In addition, according to the present embodiment, the rotation guide pins 201a and 201b are located on the fixed aperture base plate 201 so that the relative positional relation between the pins and the pinion gear 106 is not changed over the entire opening diameter from the open aperture to the minimum aperture. Therefore, it is possible to drive the aperture driving ring 202 with the minimum amount of the eccentricity as shown at 0 degrees and 90 degrees in the graph of FIG. 6A.

Although examples in which a stepping motor is used as the rotary drive unit are described in both of the first and second embodiments, the present invention is not limited to such configuration, and it is possible to use a DC motor, a brushless motor, a meter, or the like. Also, although a description is given of examples in which a gear mechanism such as the mesh of gears is used for transmission of a driving force from the rotary drive unit to the rotating unit, the present invention is not limited to such configuration, and it is possible to employ a configuration using a pin mechanism comprising a rocking pin in a meter, a pin located on a rotating unit, and a groove engaging with these pins.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-049834 filed Mar. 13, 2014, which is hereby incorporated by reference herein in its entirety.

What is claimed is:

1. A light amount adjusting apparatus, which is arranged in an optical path, for driving aperture blades and changing an opening diameter to adjust a light amount, the light amount adjusting apparatus comprising:
   a base supporting a motor; and
   a ring-shaped member arranged rotatably about a predetermined axis with respect to the base, and that drives the aperture blades with the motor,
   wherein one of the base or the ring-shaped member is provided with two arc-shaped engaged parts disposed around the axis, and the other of the base or the ring-shaped member is provided with two engaging parts each engaging with one of the arc-shaped engaged parts.

2. The light amount adjusting apparatus according to claim 1, further comprising:
   a driven gear provided on a portion of a circumference of the ring-shaped member; and
   a driving gear driven by the motor arranged to mesh with the driven gear,
   wherein one part, among the arc-shaped engaged parts and the engaging parts, is located at a position closer to the axis than the driven gear in the ring shaped.

3. The light amount adjusting apparatus according to claim 1, wherein the two engaging parts are arranged around the axis at an angle of 90 degrees.

4. The light amount adjusting apparatus according to claim 1, further comprising:
   a driven gear provided on a portion of a circumference of the ring-shaped member; and
   a driving gear driven by the rotary drive unit is motor arranged to mesh with the driven gear,
   wherein the two engaging parts are provided on the ring-shaped member, and
   wherein one of the two engaging parts is positioned at an angle corresponding to an angle at which the driving gear is arranged centering on the axis, within an angular range in which the ring-shaped member is able to rotate with respect to the base.

5. The light amount adjusting apparatus according to claim 1, further comprising:
   a driven gear provided on a portion of a circumference of the ring-shaped member; and
   a driving gear driven by the motor arranged to mesh with the driven gear,
   wherein the two engaging parts are provided on the base, wherein one of the engaging parts is positioned at an angle corresponding to an angle at which the driving gear is arranged centering on the axis.

6. The light amount adjusting apparatus according to claim 1, wherein the engaging parts are pins, and the arc-shaped engaged parts are arc-shaped grooves.

7. The light amount adjusting apparatus according to claim 1, wherein the predetermined axis is a central axis of an opening included in the ring-shaped member.

8. A lens barrel comprising:
   an optical system having lens groups; and
   a light amount adjusting apparatus arranged in the optical system and comprising:
     a base supporting a motor; and
     a ring-shaped member arranged rotatably about a predetermined axis with respect to the base, and that drives the aperture blades with the motor,
     wherein one of the base or the ring-shaped member is provided with two arc-shaped engaged parts disposed around the axis, and the other of the base or the ring-shaped member is provided with two engaging parts each engaging with one of the arc-shaped parts.

9. The lens barrel according to claim 8, wherein the predetermined axis is an optical axis of the optical system.

10. An optical apparatus comprising:
    a camera; and
    a lens barrel having:
      an optical system which has lens groups; and
      a light amount adjusting apparatus, which is arranged in the optical system and comprises:
        a base supporting a motor; and
        a ring-shaped member arranged rotatably about a predetermined axis with respect to the base, and that drives the aperture blades with the motor,
        wherein one of the base or the ring-shaped member is provided with two arc-shaped engaged parts disposed around the axis, and the other of the base or the ring-shaped member is provided with two engaging parts each engaging with one of the arc-shaped parts.

* * * * *